United States Patent [19]
Panoushek et al.

[11] Patent Number: 5,467,582
[45] Date of Patent: Nov. 21, 1995

[54] COTTON PICKER SPINDLE MOISTENING SYSTEM

[75] Inventors: Dale W. Panoushek, Orion, Ill.; Calvin J. Kraning, Valley City, N. Dak.

[73] Assignee: Case Corporation, Racine, Wis.

[21] Appl. No.: 258,461

[22] Filed: Jun. 10, 1994

[51] Int. Cl.[6] .................................................. A01D 46/16
[52] U.S. Cl. ............................ 56/10.2 R; 56/41; 56/50
[58] Field of Search .............................. 56/41, 43, 47, 56/40, 10.2 R

[56] References Cited

U.S. PATENT DOCUMENTS

| | | |
|---|---|---|
| 2,593,671 | 4/1952 | Hagen et al. |
| 2,711,066 | 6/1955 | Barbknecht |
| 2,854,767 | 8/1958 | Crawford |
| 4,793,127 | 12/1988 | Sheldon, Jr. ............... 56/41 |
| 4,821,498 | 4/1989 | Deutsch et al. ............ 56/50 |
| 4,840,018 | 6/1989 | Deutsch ................... 56/41 X |
| 4,850,184 | 7/1989 | Deutsch et al. ............ 56/41 |
| 4,905,464 | 3/1990 | Thedford .................. 56/50 |
| 5,018,343 | 5/1991 | Finke ..................... 56/41 X |

*Primary Examiner*—Terry Lee Melius
*Attorney, Agent, or Firm*—Foley & Lardner

[57] ABSTRACT

A cotton picker moistening system is provided that includes a pump driven by an electric motor to deliver a pressurized flow of moistening fluid. The system also includes a detecting device for generating a sensed parameter signal representative of a characteristic of the fluid delivered by the pump, such as pressure or flow rate, and a signal generator for generating a desired parameter signal representative of the desired characteristic. A control circuit compares the sensed and desired parameter signals and generates a control signal derived from the sensed and desired parameter signals. The control signal is applied to the electric motor, the pump or a regulating device downstream of the pump to control the delivery of moistening fluid. A flush switch is provided to override the control circuit and cause predetermined flow of fluid to be delivered.

39 Claims, 5 Drawing Sheets

5,467,582

COTTON PICKER SPINDLE MOISTENING SYSTEM

FIELD OF THE INVENTION

The present invention relates generally to a system for moistening the spindles of a cotton picking machine and, more particularly, to a moistening system employing closed loop feedback control to provide a desired flow of moistening fluid to the spindles of a cotton picking machine.

BACKGROUND OF THE INVENTION

In cotton picking machines of known design, such as exemplified by the Model 2055 Cotton Picker available from Case Corporation, cotton fibers are harvested from mature cotton plants by rotating spindles that contact the cotton bolls and strip the fibers from the plants. These spindles extend horizontally and rotate about a generally horizontal axis on vertical columns, with typically 18 spindles being arranged vertically on each column. These columns are themselves rotated about vertical axes arranged in parallel around the periphery of vertical picker drums, with five or more such drums being provided on the front of a typical picking machine. In addition to rotating about their respective axes, the columns of spindles in each drum revolve about the vertical axis of the drum as the picker advances through a field of plants, causing each rotating spindle to sweep through a revolutionary path in a horizontal plane.

The revolutionary path of the spindles is designed to produce a low relative velocity between the spindles and the cotton plants to allow the spindles to strip the cotton fibers from the plants by their horizontal rotation. At another location on their revolutionary path each column of spindles passes a column of doffers where the cotton fibers are doffed from the spindles and blown into a hopper by an air stream from a fan. Because the spindles tend to accumulate plant juices, dust and debris from the cotton plants, pads are provided at still another location in the revolutionary path of the spindles to contact and apply moisture to the spindles, thereby reducing the accretion of foreign materials that would otherwise reduce the harvesting efficacy of the spindles. These pads are generally arranged horizontally in a vertical column such that one pad contacts each spindle as the spindle sweeps past in its revolution within the drum. A detailed description of a cotton picking machine of the type described is provided in U.S. Pat. No. 4,905,464 issued to Thedford on Mar. 6, 1990, and of common ownership with the present invention. The entire disclosure of U.S. Pat. No. 4,905,464 is hereby incorporated into the present disclosure by reference.

In such cotton picking machines a spindle moistening system is provided that includes a tank for moistening fluid, a fluid pump coupled to the tank, a fluid conduit for directing fluid from the pump and a flow control valve connected to the conduit for manually setting the fluid flow rate. Downstream of the flow ,control valve the fluid is directed to a distribution manifold and, from there, to conduits feeding each pad. Such systems may also include a conventional pressure gauge for reading the fluid pressure in the vicinity of the flow control valve.

While generally effective for supplying moisture to the rotating spindles, such moistening systems have limitations and drawbacks. The use of an in-line flow control valve to regulate the pressure and flow of fluid to the moistening pads affords only a very rough, open loop control of moistening. Changes in the pressure of the moistening fluid, and hence in the flow of fluid to the moistening pads, may occur during operation of the machine and must be corrected manually by readjusting the flow control valve. Reasons for such pressure changes typically include a decreasing level of fluid in the reservoir, fluctuations in the supply voltage to the pump, and temperature changes during operation of the picker. Moreover, while in certain circumstances it would be desirable to flush the moistening system by momentarily increasing the fluid flow to the moistening pads, known moistening systems do not provide a convenient means for performing such flushes.

The present invention is directed to overcoming the drawbacks of the existing techniques set forth above. In particular, the invention is directed to a cotton picker spindle moistening system employing a control system to provide feedback control of the pressure and flow rate of the moistening fluid.

SUMMARY OF THE INVENTION

In accordance with one aspect of the invention, there is provided a moistening system for an agricultural harvester such as a cotton picking machine, the moistening system including a fluid pump coupled to an electric motor and adapted to draw fluid from a reservoir and to deliver a flow of pressurized fluid to a fluid distribution circuit, and a plurality of moisture dispensers adapted to receive fluid from the fluid distribution circuit and to apply moisture to the implements. The system further includes a monitoring device coupled to the fluid distribution circuit and configured to generate a sensed parameter signal representative of a characteristic of the fluid delivered to the fluid distribution circuit, such as pressure or flow rate. The system also includes a command signal generator configured to generate a desired parameter signal representative of a desired characteristic of the fluid delivered to the fluid distribution circuit. A control circuit is coupled to the monitoring device, the command signal generator and the electric motor, and is configured to generate a control signal derived from the desired parameter signal and the sensed parameter signal, and to apply the control signal to the electric motor to control a characteristic of the fluid delivered by the pump.

In accordance with another aspect of the invention, a moistening system for an agricultural harvester such as a cotton picking machine is provided including a regulating device coupled in the fluid distribution circuit between the pump and the moisture dispensers and configured to regulate a characteristic of the fluid delivered to the fluid distribution circuit in response to control signals from the control circuit. In accordance with this aspect of the invention, the control circuit generates a control signal derived from the desired parameter signal and the sensed parameter signal and applies this control signal to the regulating device to regulate a characteristic of the fluid delivered by the pump.

BRIEF DESCRIPTION OF THE DRAWINGS

The present invention will become more fully understood from the following detailed description, taken in conjunction with the accompanying drawings, wherein like reference numeral refer to like parts, in which.

Figure 1:
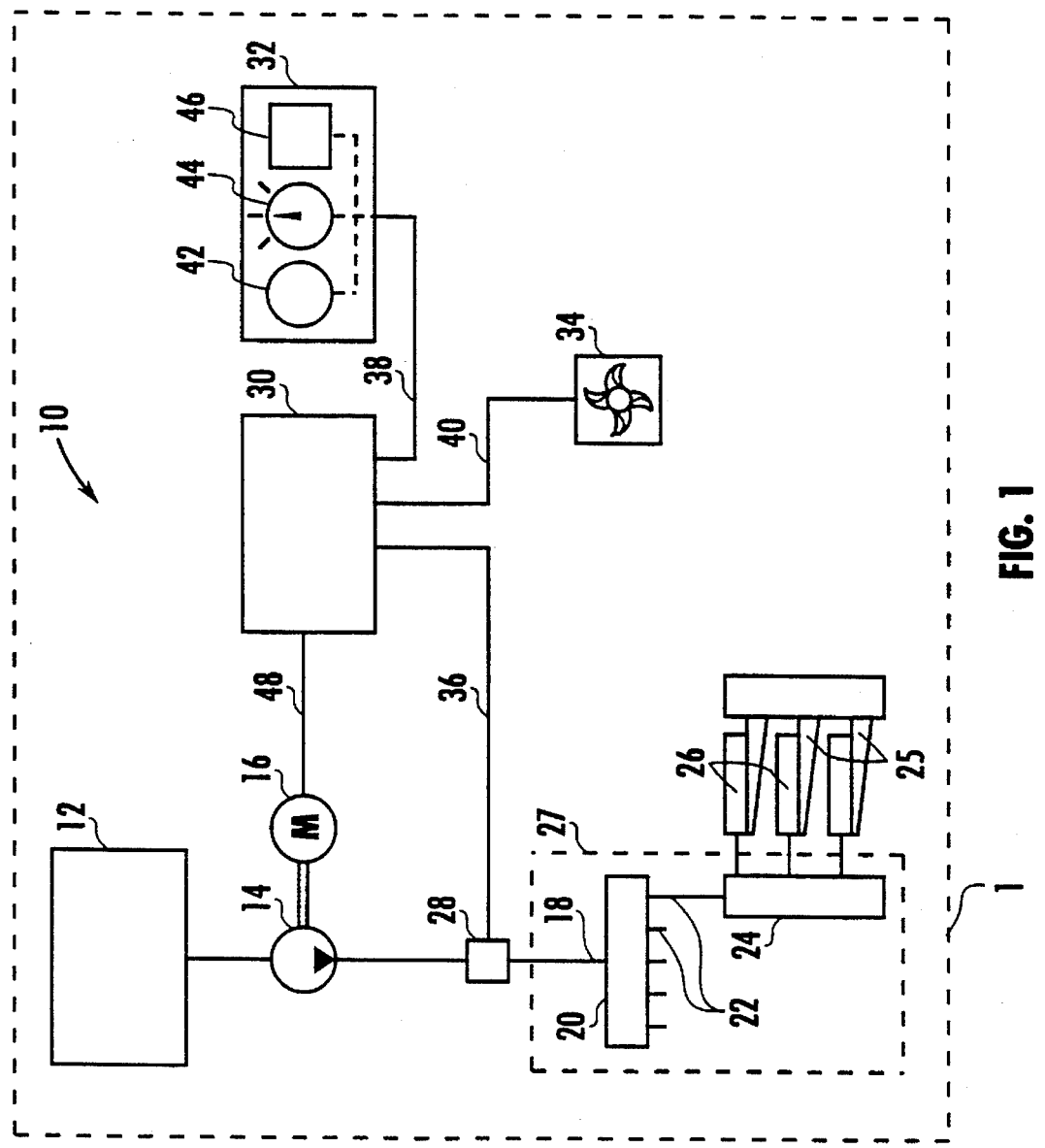
FIG. 1 is a diagrammatical illustration of a moistener system in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring to FIG. 1, a cotton picking machine 1 includes a moistening system designated generally by the reference numeral 10. Moistening system 10 includes fluid reservoir 12 and fluid pump 14. Pump 14 is mechanically coupled to electric motor 16. The inlet of pump 14 is fluid coupled to reservoir 12, while the outlet of pump 14 is coupled to fluid conduit 18 for delivering a pressurized fluid stream from pump 14 to a distribution manifold 20. Distribution manifold 20 includes a number of outlets 22, each coupled to a moistener column 24 supporting a plurality of moisture dispensers or moistening pads 26. Each moistening pad 26 is arranged on the moistener column 24 to contact and apply moisture to a corresponding rotating implement or spindle 25 as the spindle sweeps around its revolutionary path during picking. Although a single column 24 is illustrated in FIG. 1, it should be understood that similar columns are coupled to each outlet 22 of distribution manifold 20. One moistener column 24 is provided for each picking drum of the cotton picking machine 1 on which moistening system 10 is installed, with a typical cotton picking machine including five or more such picking drums. In the configuration illustrated in FIG. 1, pump 14, driven by electric motor 16, draws fluid from reservoir 12 and supplies a stream of pressurized fluid to manifold 20 via conduit 18. The stream of fluid is divided in manifold 20 and flows through outlets 22 to columns 24 where fluid is directed to moistening pads 26 and applied to spindles 25.

Conduit 18, manifold 20, and column 24, along with similar columns and interconnecting piping (not shown), constitute a fluid distribution circuit 27 of generally known construction. Moistening pads 26 are also of generally known design. One such pad 26 is provided for each spindle 25 of the cotton picking machine, and pads 26 are suitably disposed to apply a fluid to spindles 25, thereby moistening the spindles to avoid undesirable accretion of plant juices and dust. A detailed description of the picker drums, moistener columns, moistening pads and spindles of a typical cotton picking machine is provided in U.S. Pat. No. 4,905,464 to which reference has already been made.

As shown in FIG. 1, moistening system 10 also includes detecting or monitoring device 28, control circuit 30 and operator interface 32. Also schematically represented in FIG. 1 is fan 34 which, while not itself part of the control system, provides an indication of the operational state of the picking machine as will be discussed. The structure and operation of fan 34 are generally known in the art. Detecting device 28, interface 32 and fan 34 are coupled or linked to control circuit 30 by conductors 36, 38 and 40 respectively.

Detecting device 28 is coupled between pump 14 and pads 26, and may be coupled to conduit 18 between pump 14 and manifold 20 as illustrated in FIG. 1. As will be discussed in greater detail below, detecting device 28 measures a characteristic of the fluid delivered by pump 14, such as pressure or flow rate, and generates a sensed parameter signal ps representative of the sensed characteristic. Where control of moistening system 10 is based upon the pressure developed by pump 14, detecting device 28 may be any suitable pressure measurement device, such as a pressure transducer capable of producing an electrical signal representative of fluid pressure. Where control is based upon the flow rate of fluid output by pump 14, detecting device 28 may be any suitable flow meter (sensor) capable of producing an electrical signal representative of flow rate. Detecting device 28 applies sensed parameter signal ps to control circuit 30 through conductor 36.

Operator interface 32, preferably located in the cab (not shown) of the cotton picking machine 1, includes signal generator 42, switch 44 and indicator or read-out 46. generator 42 produces a desired parameter signal pd representative of a desired characteristic of the fluid delivered or output by pump 14, such as pressure or flow rate. In the present embodiment signal generator 42 includes a potentiometer the output voltage of which can be adjusted between a minimum and a maximum voltage to generate desired parameter signal pd. Switch 44 is preferably a rocker switch with three stable positions, on and off, and a position for flushing the moistening system as will be discussed below. Indicator 46 is an electronic display device such as an LED or LCD device having three seven element arrays for displaying a three digit number. Conductor 38 is a signal bus and may include several separate conductors for transmitting the desired parameter signal pd and the state S of switch 44 to control circuit 30, and for transmitting signals, such as ps or pd to indicator 46 for display.

As illustrated in FIG. 1, control circuit 30 is coupled to fan 34. Because the spindle moistening system 10 will generally need to function only when cotton is actually being picked, a signal F representative of the state (i.e. on or off) of fan 34 is used to provide an indication of whether picking is in progress. Thus, while only fan 34 is schematically shown in FIG. 1, control circuit 30 may be coupled to any part of the electrical circuit controlling or supplying power to fan 34. Moreover, a similar signal indicative of whether picking is in progress may be taken from any suitable circuit on the cotton picker.

In the embodiment illustrated in FIG. 1, control circuit 30 is coupled to electric motor 16 by conductor 48. In this embodiment control circuit 30 receives input signals ps, pd, S, and F from detecting device 28, signal generator 42, switch 44 and fan 34 respectively, generates a control signal U derived from the sensed and the desired parameter signals, and applies the control signal to electric motor 16 via conductor 48. Control signal U is preferably a pulse width modulated signal produced by control circuit 30 and capable of varying the speed of motor 16, thereby varying the output of pump 14. In the present embodiment pump 14 is a diaphragm pump the output of which is a function of the speed at which it is driven.

Because the fluid resistance of fluid distribution circuit 27 formed by conduit 18, manifold 20, columns 24, and the conduits interconnecting these elements, causes a back pressure between pump 14 and pads 26 that is a function of fluid flow rate, control of the delivery of fluid to pads 26 can be achieved on the basis of pressure or flow rate. In the embodiment illustrated in FIG. 1, the pulse width modulated control signal U applied by control circuit 30 to motor 16 regulates the speed of motor 16 and pump 14. By so regulating the speed of pump 14 the flow rate output by pump 14 is controlled, resulting in control of the back pressure between pump 14 and pads 26. Where control is based upon pressure, detecting device 28 generates a sensed pressure signal and applies this signal to control circuit 30. Control circuit 30 generates control signal U and applies this signal to motor 16 to regulate the pressure produced in the fluid by pump 14. Alternatively, where control is on the basis of flow rate, detecting device 28 generates a sensed flow rate signal and applies this signal to control circuit 30 to serve as a basis for deriving control signal U.

Figure 2:
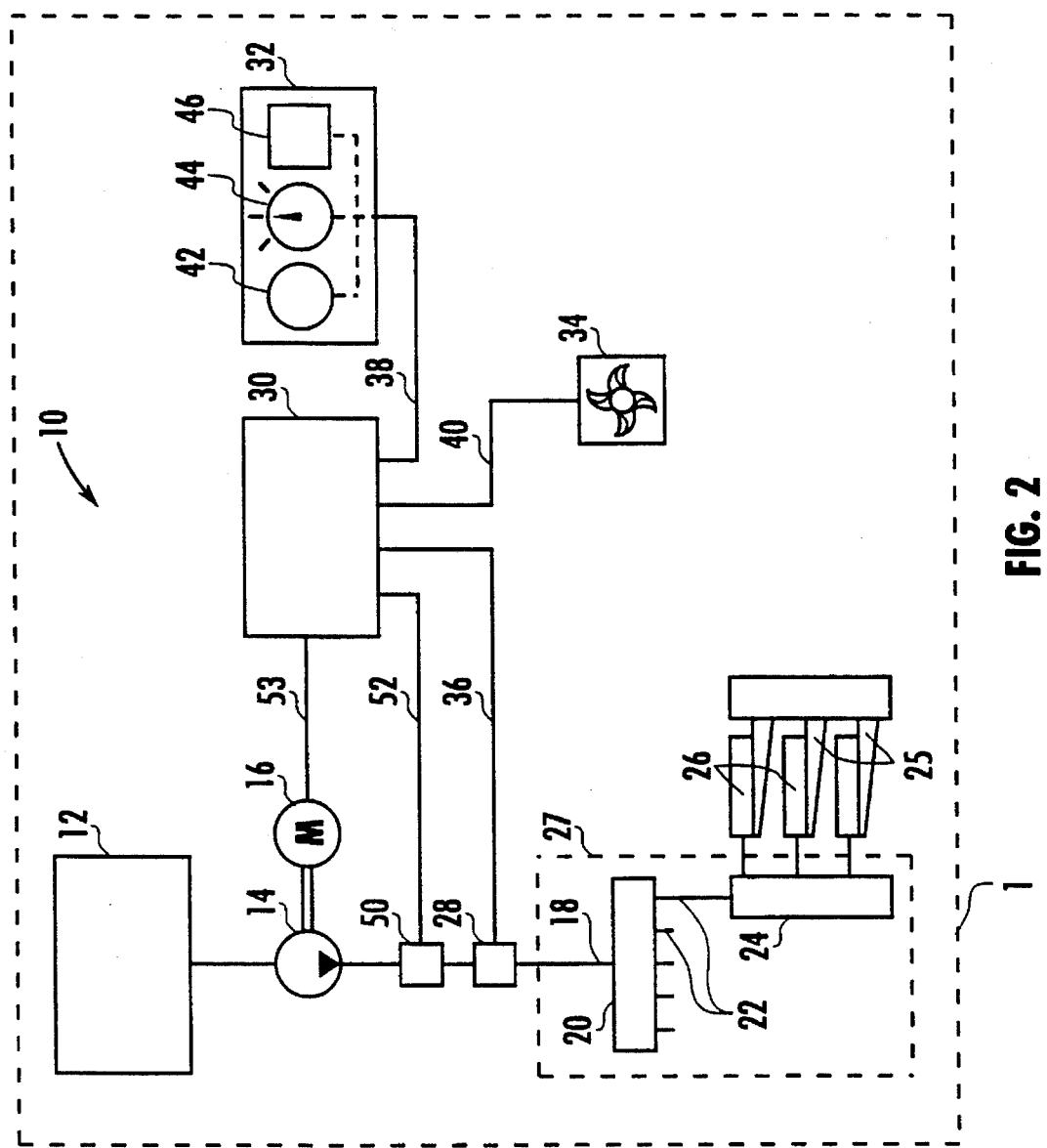
FIG. 2 is a diagrammatical illustration of an alternative embodiment of the invention.

In the alternative embodiment illustrated in FIG. 2, moistening system 10 includes a regulating device 50 in fluid communication with conduit 18. Regulating device 50 is coupled to control circuit 30 by conductor 52. In this embodiment control circuit 30 receives signals as discussed above with reference to FIG. 1, generates a control signal U, and applies this control signal to regulating device 50. Regulating device 50 may be a pressure regulator where control is performed on the basis of pressure, or a flow control device where control is based upon fluid flow rate. In either case, regulating device 50 may be of any suitable type, of generally known design, capable of regulating the downstream pressure or flow rate in response to control signal U. In addition, circuit 30 applies on and off signals to motor 16 via conductor 53. It should be noted that in this alternative embodiment, because the pressure or flow rate delivered by pump 14 is controlled independently of the pump speed, the driver of pump 14 is not limited to an electric motor 16, but may be any suitable driver such as the engine of cotton picking machine 1.

Figure 3:
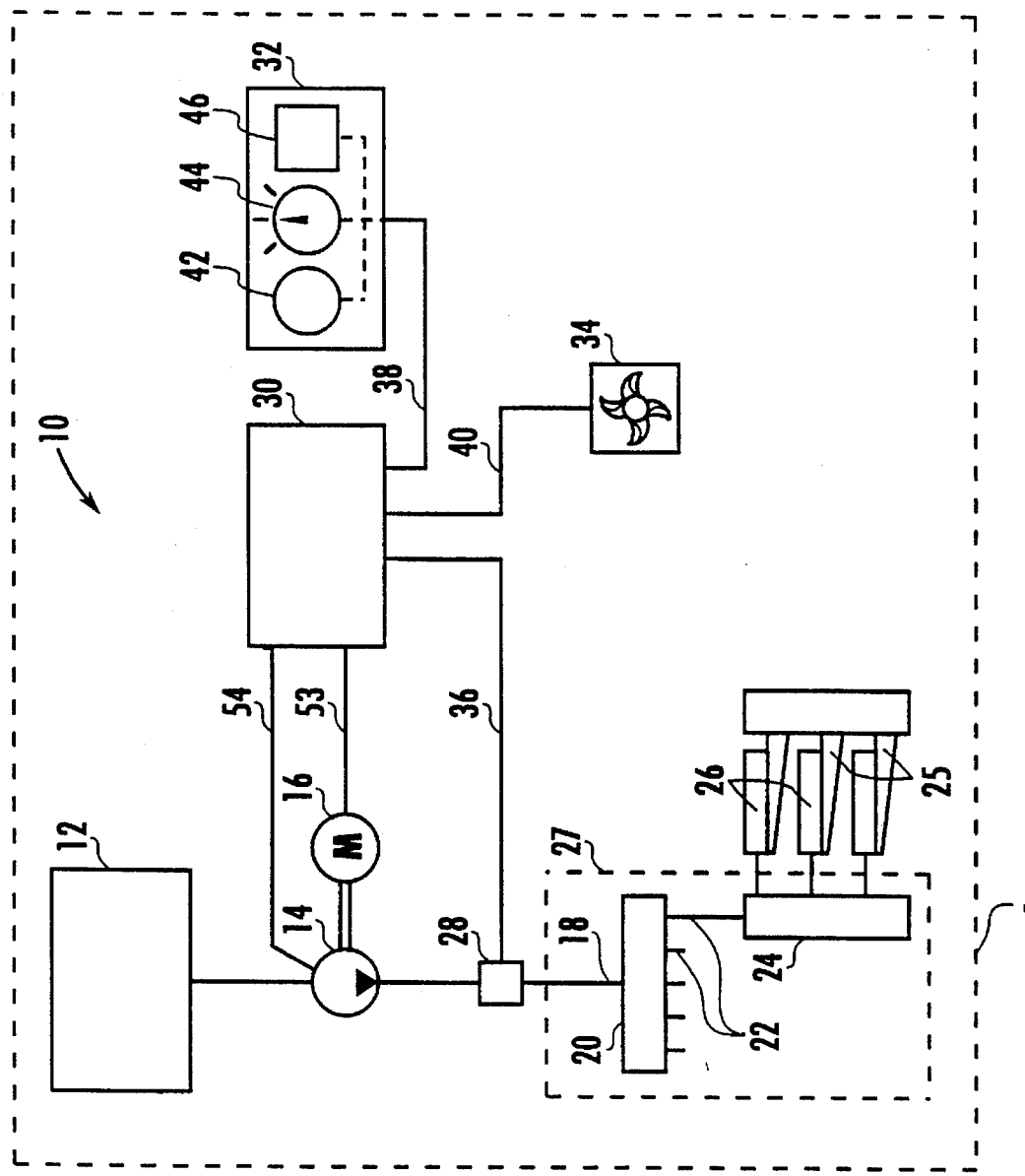
FIG. 3 is a diagrammatical illustration of a further alternation embodiment of the invention.

A further alternative embodiment of moistening system 10 is illustrated in FIG. 3. In this embodiment pump 14 is a variable displacement pump, the output of which can be varied in response to control signals from control circuit 30. Commercially available pumps suitable for use in this embodiment of moistening system 10 include a controller section (not shown) adapted to vary the pressure or flow rate output of the pump as a function of control signal U. The controller of pump 14 is coupled to control circuit 30 and receives control signals via conductor 54 and motor 16 is coupled to circuit 30 and receives on and off signals via conductor 53. In this embodiment, detecting device 28 is preferably a pressure transducer.

Figure 4:
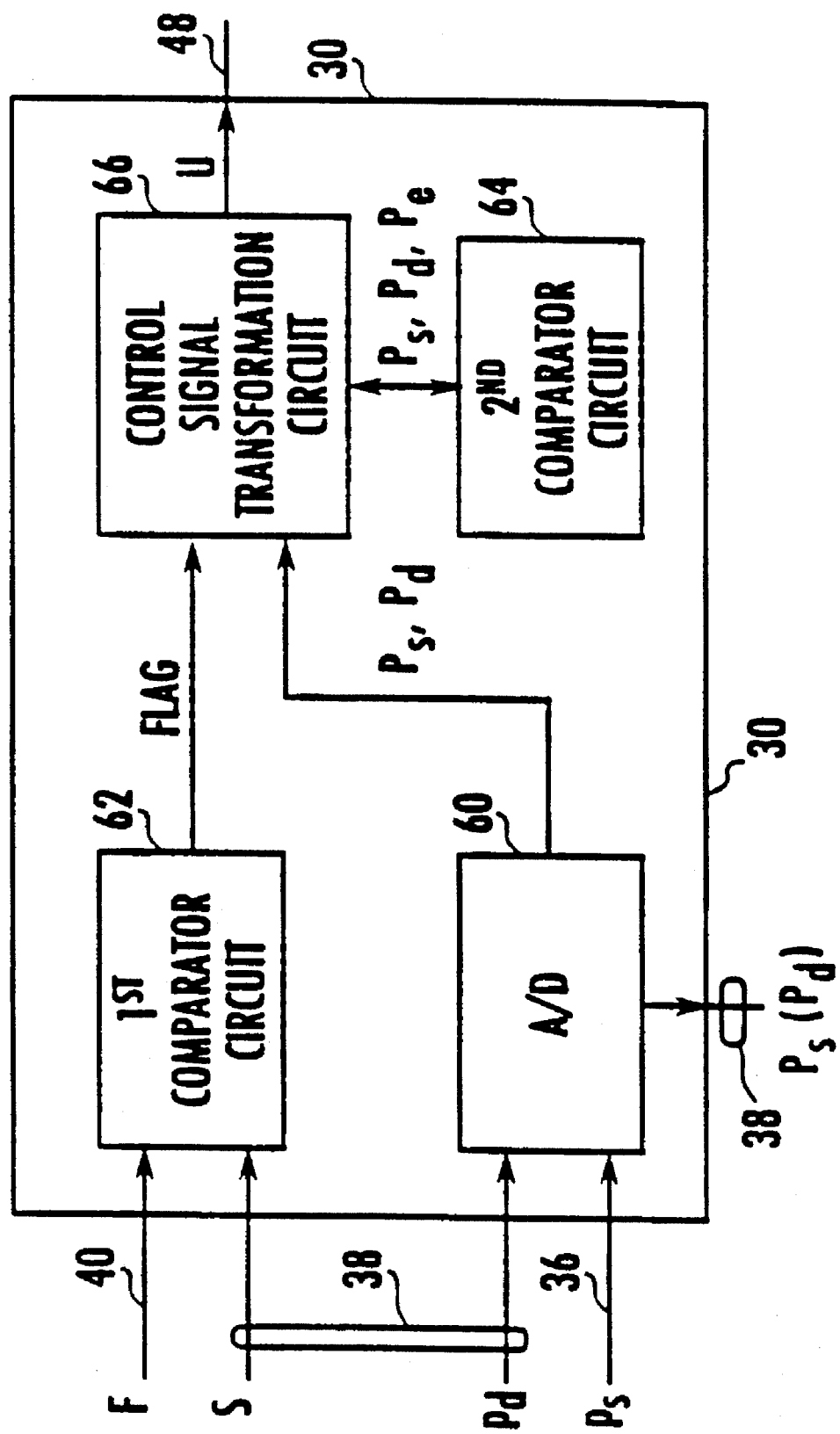
FIG. 4 is a block diagram representation of the control circuit for the invention.

As illustrated in FIG. 4, control circuit 30 includes analog-to-digital converter 60, first comparator circuit 62, second comparator circuit 64 and control signal transformation circuit 66. In the preferred embodiment these elements are included in an appropriately configured (programmed) microprocessor. FIG. 4 illustrates the flow of the various signals, or digital values, between these parts of control circuit 30. Signals S and F, representative of the states of switch 44 and fan 34 respectively, are applied to control circuit 30 and are compared to threshold values in first comparator circuit 62. If both signals indicate that moistening system 10 and fan 3.4 are switched on, a "flag" signal is transmitted to control signal transformation circuit 66, indicating that a control signal is to be generated and applied to control a characteristic of the fluid delivered by pump 14. Signals ps and pd, representative of the sensed parameter detected by detecting device 28 and the desired parameter set on signal generator 42, are applied to analog-to-digital converter 60 where they are converted to digital values Ps and Pd respectively. Control circuit 30 is configured to apply the value Ps to indicator 46. Additionally, the value Pd may be applied to indicator 46, and an appropriate switching circuit may be provided to allow an operator to view either value. Both of these values are applied to control signal transformation circuit 66, which directs second comparator circuit 64 to determine the difference between them, represented by the value Pe. Based upon the values of Pe and Pd, control signal transformation circuit 66 generates a control signal U. This control signal is applied by control circuit 30 either to motor 16, regulating device 50 or pump 14, depending upon which embodiment of moistening system 10 is installed. Control circuit 30 may include additional signal conditioning and filtering circuitry depending upon the other components selected for moistening system 10.

Figure 5:
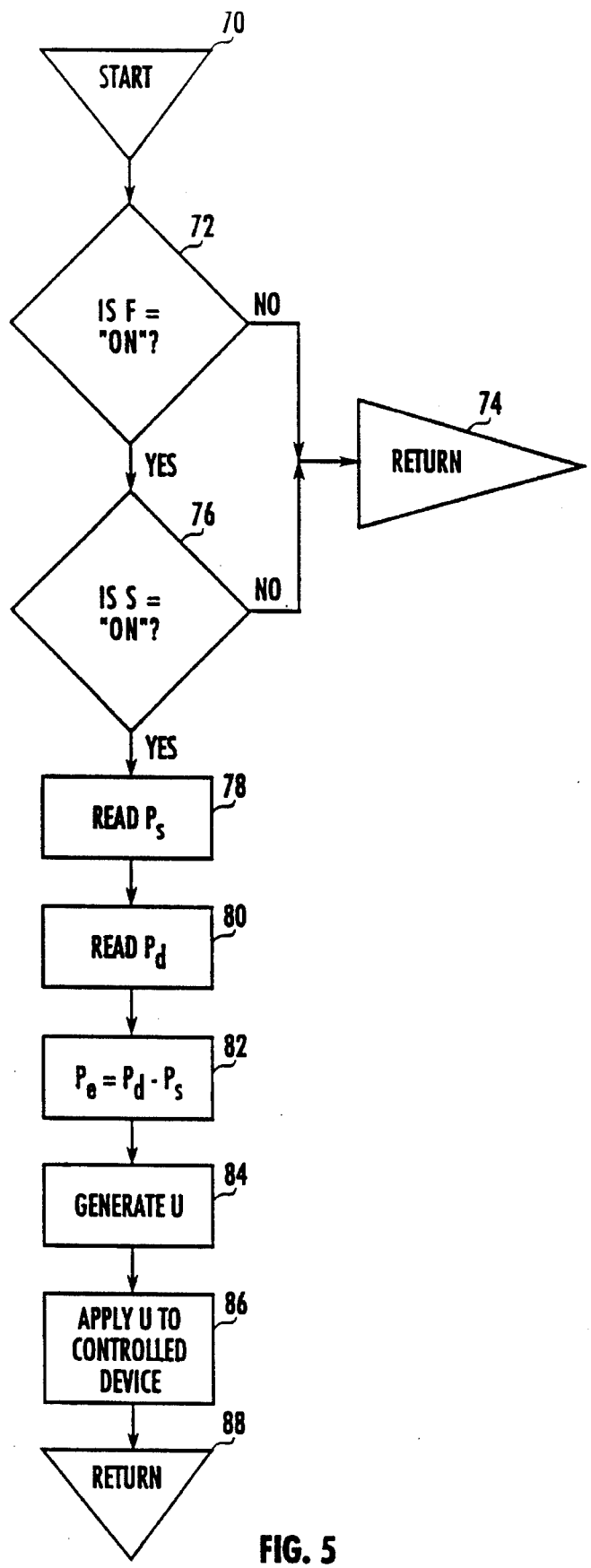
FIG. 5 is a block diagram illustrating a typical sequence of steps in control logic implementing the invention.

FIG. 5 illustrates the various steps in control logic for control circuit 30 implementing moistening system 10 and through which control circuit 30 is configured to continuously cycle. Where control circuit 30 is included in a programmed microprocessor, the steps represented in FIG. 5 may be part of a longer sequence of control steps through which the microprocessor cycles, including steps related to control of other systems or subsystems of the picker.

Step 70 represents the beginning of the moistener control sequence. At step 72 first comparator circuit 62 compares signal F, indicative of the state of fan 34, to a threshold value to determine if fan 34 is on. If fan 34 is not on, control circuit 30 advances to step 74, returning to step 70. If fan 34 is on, control circuit advances to step 76 where comparator circuit 62 compares signal S, indicative of the state of switch 44, to a threshold value. If switch 44 is in the "off" position control circuit 30 goes to step 74 and again returns to step 70. If switch 44 is in the "on" position, control circuit 30 advances to step 78 where control signal transformation circuit 66 reads the digital value of the sensed parameter signal, Ps. At step 80 control signal transformation circuit 66 reads the digital value of the desired parameter signal, Pd. At step 82 second comparator circuit 64 determines parameter error value Pe, representing the difference between the sensed and desired parameter values. At step 84, based upon this error value, control signal transformation circuit 66 generates a control signal U. In the present embodiment control signal U is proportional to error value Pe. If in subsequent loops through the logical steps illustrated in FIG. 5 the sensed parameter signal is found to be higher than the desired parameter signal, control signal U is decremented. Conversely, if the sensed parameter signal is lower than the desired parameter signal, control signal U is incremented. In both cases control circuit 30 generates control signal U so as to reduce error value Pe to zero. At step 86 control signal U is applied to the controlled device. The controlled device receiving this control signal is either motor 16, regulating device 50 or pump 14, depending upon the embodiment of moistening system 10 installed. At step 88 control circuit 30 returns to step 70.

Where control circuit 30 is included in an appropriately programmed microprocessor, this pulse width modulated signal U may be generated by the microprocessor or by a suitable circuit external to the microprocessor. Control signal transformation circuit 66 is configured to generate control signal U between predetermined minimum and maximum values. These minimum and maximum values correspond to the minimum (e.g. rotated full left) and maximum (e.g. rotated full right) settings of signal generator 42. In the present embodiment the minimum and maximum values of control signal U result in pressures of 4 psi and 32 psi respectively at detecting device 28.

An important feature of moistening system 10 is the ability to provide a relatively high flow of moistening fluid upon demand to flush the system. This feature enables moistening system 10 to be flushed both during normal operation, and provides a backup means of supplying fluid to pads 26 in case of failure of control circuit 30. In the present embodiment, switch 44 includes a "flush" position. When switch 44 is depressed in this position, a signal of predetermined magnitude, generally greater than the maximum control signal U, is applied directly to the controlled device (i.e. motor 16, regulating device 50 or pump 14), causing fluid at a predetermined flow or pressure to be delivered to pads 26. In the present embodiment depressing switch 44 in the "flush" position causes pump 14 to provide fluid at a pressure of approximately 60 psi at detecting device 28. When switch 44 is released from the "flush" position, control of moistening system 10 is returned to control circuit 30 and based upon control signal U as discussed above.

We claim:

1. A moistening system for an agricultural harvesting vehicle including a plurality of rotating harvesting implements, the moistening system comprising:

a fluid pump coupled to an electric motor and adapted to draw fluid from a reservoir and to deliver a flow of pressurized fluid to a fluid distribution circuit;

a plurality of moisture dispensers adapted to receive fluid from the fluid distribution circuit and to apply moisture to the implements;

a monitoring device coupled to the fluid distribution circuit and configured to generate a sensed pressure signal representative of the pressure of the fluid delivered to the fluid distribution circuit;

a command signal generator configured to generate a desired pressure signal representative of a desired pressure of the fluid delivered to the fluid distribution circuit; and a control circuit coupled to the monitoring device, the command signal generator and the electric motor, and configured to generate a control signal derived from the desired pressure signal and the sensed pressure signal, and to apply the control signal to the electric motor to control the pressure of the fluid delivered by the pump.

2. A moistening system as recited in claim 1 wherein the monitoring device is a pressure transducer.

3. A moistening system as recited in claim 1 wherein the command signal generator includes a potentiometer.

4. A moistening system as recited in claim 1 further comprising a pressure indicator, and wherein the control circuit is coupled to the pressure indicator and configured to apply at least the sensed pressure signal to the indicator.

5. A moistening system as recited in claim 1 wherein the control circuit is included in a digital signal processor.

6. A moistening system as recited in claim 1 wherein the electric motor is a direct current electric motor and the control signal is a pulse width modulated signal adapted to vary the speed of the electric motor and thereby vary the pressure of the fluid output by the pump.

7. A moistening system as recited in claim 1 further comprising a flush switch coupled to the electric motor and configured to generate an operator induced flush signal overriding the control signal and causing a predetermined flow of fluid to be delivered by the pump to the fluid distribution circuit.

8. A moistening system for an agricultural harvesting vehicle including a plurality of rotating harvesting implements, the moistening system comprising:

a fluid pump adapted to draw fluid from a reservoir and to deliver a flow of pressurized fluid to a fluid distribution circuit;

a plurality of moisture dispensers adapted to receive fluid from the fluid distribution circuit and to apply moisture to the implements;

a monitoring device coupled to the fluid distribution circuit and configured to generate a sensed flow rate signal representative of the flow rate of the fluid delivered to the fluid distribution circuit;

a flow rate regulating device coupled in the fluid distribution circuit between the pump and the moisture dispensers and configured to regulate the flow rate of the fluid delivered to the fluid distribution circuit in response to control signals from a control circuit;

a command signal generator configured to generated a desired flow rate signal representative of a desired flow rate of the fluid delivered to the fluid distribution circuit; and a control circuit coupled to the :monitoring device, the command signal generator and the flow rate regulating device, and configured to generate a control signal derived from the desired flow rate signal and the sensed flow rate signal, and to apply the control signal to the flow rate regulating device to regulate the flow rate of the fluid delivered by the pump.

9. A moistening system as recited in claim 8 wherein the monitoring device is a flow meter.

10. A moistening system as recited in claim 8 wherein the command signal generator includes a potentiometer.

11. A moistening system as recited in claim 8 further comprising a flow rate indicator, and wherein the control circuit is coupled to the flow rate indicator and configured to apply at least the sensed flow rate signal to the indicator.

12. A moistening system as recited in claim 8 wherein the control circuit is included in a digital signal processor.

13. A moistening system as recited in claim 8 wherein the control signal is a pulse width modulated signal adapted to vary the fluid flow rate output of the flow rate regulating device.

14. A moistening system as recited in claim 8 further comprising a flush switch coupled to the regulating device and configured to generate an operator induced flush signal overriding the control signal and causing fluid at a predetermined pressure to be delivered by the pump to the fluid distribution circuit.

15. A moistening system for an agricultural harvesting vehicle including a plurality of rotating; harvesting implements, the moistening system comprising:

pumping means adapted to draw fluid from a reservoir and to output a flow of pressurized fluid to a fluid distribution circuit;

moisture dispensing means adapted to receive fluid from the fluid distribution circuit and to apply moisture to the implements;

detecting means coupled to the fluid distribution circuit for generating a sensed parameter signal representative of a parameter of the fluid output by the pumping means;

command signal generating means for generating a desired parameter signal representative of a desired parameter of the fluid output by the pumping means; and control means coupled to the detecting means, the command signal generating means and the pumping means, for generating a control signal from the desired parameter signal and the sensed parameter signal, and for applying the control signal to the pumping means to control the parameter of the fluid output by the pump.

16. A moistening system as recited in claim 15 further comprising indicator means, and wherein the control means is coupled to the indicator means and applies at least the sensed parameter signal to the indicator means.

17. A moistening system as recited in claim 15 wherein the control means is included in a digital signal processor.

18. A moistening system as recited in claim 15 wherein the pumping means include a fluid pump coupled to an electric motor.

19. A moistening system for an agricultural harvesting vehicle including a plurality of rotating harvesting implements, the moistening system comprising:

pumping means adapted to draw fluid from a reservoir and to output a flow of pressurized fluid to a fluid distribution circuit;

moisture dispensing means adapted to receive fluid from the fluid distribution circuit and to apply moisture to the implements;

monitoring means coupled to the fluid distribution circuit and configured to generate a sensed parameter signal representative of a parameter of the fluid output by the pump;

regulating means coupled to the fluid distribution circuit and configured to regulate the parameter of the fluid output by the pump in response to control signals from a control circuit;

command signal generating means configured to generate a desired parameter signal representative of a desired parameter of the fluid output by the pump; and control means coupled to the monitoring means, the command signal generating means and the regulating means, and configured to generate a control signal derived from the desired parameter signal and the sensed parameter signal, and to apply the control signal to the regulating means to regulate the parameter of the fluid output by the pump.

20. A moistening system as recited in claim 19 further comprising indicator means, and wherein the control means is coupled to the indicator means and applies at least the sensed parameter signal to the indicator means.

21. A moistening system as recited in claim 19 wherein the control means is included in a digital signal processor.

22. A moistening system for a cotton picking machine, the machine including a plurality of spindles for removing cotton from cotton plants, the moistening system comprising:

a plurality of moistening pads adapted to apply moisture to the spindles;

a plurality of fluid[conduits coupled to the moistening pads and to a distribution manifold for directing fluid from the manifold to the moistening pads;

a fluid pump coupled to an electric motor and adapted to draw fluid from a reservoir and to deliver a flow of pressurized fluid to the distribution manifold;

a monitoring device coupled between the pump and the manifold and configured to generate a sensed pressure signal representative of the actual pressure of the fluid;

a command signal generator configured to generate an operator induced desired pressure signal representative of a desired pressure of the fluid; and a control circuit coupled to the monitoring device, the command signal generator and the electric motor, and configured to generate a control signal derived from the desired pressure signal and the sensed pressure signal, and to apply the control signal to the electric motor.

23. A moistening system as recited in claim 22 wherein the pump is a diaphragm pump.

24. A moistening system as recited in claim 22 wherein the monitoring device is a pressure transducer.

25. A moistening system as recited in claim 22 wherein the command signal generator includes a potentiometer.

26. A moistening system as recited in claim 22 further comprising a pressure indicator, and wherein the control circuit is coupled to the pressure indicator and configured to apply at least the sensed pressure signal to the indicator.

27. A moistening system as recited in claim 22 wherein the control circuit is included in a digital signal processor.

28. A moistening system for a cotton picking machine, the machine including a plurality of spindles for removing cotton from cotton plants, the moistening system comprising:

moistening means adapted to apply moisture to the spindles;

fluid conducting means coupled to the moistening means for directing fluid from pumping means to the moistening means;

pumping means for delivering a flow of pressurized fluid to the fluid conducting means;

monitoring means coupled between the pumping means and the moistening means for generating a sensed parameter signal representative of a parameter of the fluid delivered by the pumping means;

means for generating a command signal representative of a desired parameter of the fluid delivered by the pumping means; and control means coupled to the monitoring means, the command signal generating means and the pumping means, for generating a control signal derived from the command signal and the sensed parameter signal, and for applying the control signal to the pumping means to maintain the desired parameter of the fluid delivered by the pumping means.

29. A moistening system as recited in claim 28 wherein the pumping means include a fluid pump coupled to an electric motor, and wherein the control signal is applied to the electric motor to vary the speed of the electric motor.

30. A moistening system as recited in claim 28 wherein the pumping means include fluid pump, and wherein the control signal is applied to the pump to vary an output parameter thereof.

31. A moistening system as recited in claim 28 wherein the pumping means include a diaphragm pump.

32. A moistening system as recited in claim 28 wherein the monitoring means include a pressure transducer.

33. A moistening system as recited in claim 28 wherein the means for generating a command signal include a potentiometer.

34. A moistening system as recited in claim 28 further comprising indicator means, and wherein the control means are coupled to the indicator means and configured to apply at least the sensed pressure signal to the indicator means.

35. A moistening system as recited in claim 28 wherein the control means are included in a digital signal processor.

36. A cotton picking machine, comprising:

a plurality of cotton harvesting spindles;

a plurality of moistening pads, each moistening pad of the plurality of moistening pads being adapted to contact a corresponding spindle and to apply moisture to the spindle;

a fluid pump coupled to an electric motor and adapted to draw fluid from a reservoir and to deliver a flow of pressurized fluid to the moistening pads;

a monitoring device coupled in fluid communication with the pressurized fluid between the pump and the moistening pads and configured to generate a sensed parameter signal representative of a parameter of the fluid delivered by the pump;

a command signal generator configured to generate a desired parameter signal representative of a desired parameter of the fluid delivered by the pump; and a control circuit coupled to the monitoring device, the command signal generator and the electric motor, and configured to generate a control signal derived from the desired parameter signal and the sensed parameter signal, and to apply the control signal to the electric motor to control the parameter of the fluid delivered by the pump.

37. A cotton picking machine as recited in claim 36 further comprising a flush switch coupled to the electric motor and configured to generate an operator induced flush signal overriding the control signal and causing a predetermined flow of fluid to be delivered by the pump.

38. A cotton picking machine, comprising:

a plurality of cotton harvesting spindles;

a plurality of moistening pads, each moistening pad of the plurality of moistening pads being adapted to contact a corresponding spindle and to apply moisture to the spindle;

a fluid pump coupled to an electric motor and adapted to draw fluid from a reservoir and to deliver a flow of pressurized fluid to the moistening pads;

a regulating device coupled in fluid communication with the pressurized fluid between the pump and the moistening pads and configured to regulate a parameter of the fluid delivered by the pump in response to control signals from a control circuit;

a monitoring device coupled in fluid communication with the pressurized fluid between the regulating device and the moistening pads and configured to generate a sensed parameter signal representative of a parameter of the fluid delivered by the pump;

a command signal generator configured to generate a desired parameter signal representative of a desired parameter of the fluid delivered by the pump; and a control circuit coupled to the monitoring device, the command signal generator and the pressure regulating device, and configured to generate a control signal derived from the desired parameter signal and the sensed parameter signal, and to apply the control signal to the regulating device to regulate the parameter of the fluid delivered by the pump.

39. A cotton picking machine as recited in claim 38 further comprising a flush switch coupled to the regulating device and configured to generate an operator induced flush signal overriding the control signal and causing fluid at a predetermined pressure to be delivered by the pump.

* * * * *